(12) United States Patent
Marom

(10) Patent No.: US 7,038,831 B2
(45) Date of Patent: May 2, 2006

(54) MICROMIRROR APPARATUS WITH IMPROVED IN-PLANE ROTATION TOLERANCE

(75) Inventor: Dan Mark Marom, Howell, NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 12 days.

(21) Appl. No.: 10/954,811

(22) Filed: Sep. 30, 2004

(65) Prior Publication Data

US 2006/0072184 A1 Apr. 6, 2006

(51) Int. Cl.
*G02B 26/00* (2006.01)

(52) U.S. Cl. ...................................... 359/291; 359/290

(58) Field of Classification Search ................. 359/223, 359/224, 290, 291, 295, 238, 292
See application file for complete search history.

(56) References Cited

U.S. PATENT DOCUMENTS

2002/0136490 A1* 9/2002 Zhang et al. .................. 385/33
2005/0018091 A1* 1/2005 Patel et al. .................. 348/771

* cited by examiner

*Primary Examiner*—Timothy Thompson
*Assistant Examiner*—Jerry Fang
(74) *Attorney, Agent, or Firm*—David A. Sasso

(57) ABSTRACT

A micromirror apparatus is provided with edge portion(s) of the micromirror(s) being tapered to provide a desired micromirror fill ratio and a desired amount of in-plane rotation tolerance.

11 Claims, 6 Drawing Sheets

|  | 202-A-1 | 202-A-2 | 202-A-3 | 202-A-4 | 202-A-5 | 202-A-6 |
|---|---|---|---|---|---|---|
| 205 | 202-B-1 | 202-B-2 | 202-B-3 | 202-B-4 | 202-B-5 | 202-B-6 |
|  | 202-C-1 | 202-C-2 | 202-C-3 | 202-C-4 | 202-C-5 | 202-C-6 |
|  | 202-D-1 | 202-D-2 | 202-D-3 | 202-D-4 | 202-D-5 | 202-D-6 |
|  | 202-E-1 | 202-E-2 | 202-E-3 | 202-E-4 | 202-E-5 | 202-E-6 |
|  | 202-F-1 | 202-F-2 | 202-F-3 | 202-F-4 | 202-F-5 | 202-F-6 |

207, 208, 206, 209

MICROMIRROR APPARATUS WITH IMPROVED IN-PLANE ROTATION TOLERANCE

BACKGROUND OF THE INVENTION

The present invention relates generally to Micro-Electro-Mechanical-System (MEMS) micromirrors and more particularly to micromirror design for dense micromirror arrays.

Dense arrays of micromirrors (also referred to herein as 'mirrors') using MEMS technology are finding widespread use in a variety of devices, such as, wavelength selective switches, multiplexers, optical channel blockers, projection displays, and adaptive optics. In many MEMS applications it is desirable to minimize intermirror gaps and increase the mirror fill ratio to improve optical performance. The design of a micromirror array, however, needs to balance fill ratio requirements with requirements for allowable micromirror movement, including undesired mirror movement from vibrations or excitation from external shock.

The movement of a micromirror in a mirror array can comprise in-plane and out-of-plane translations and rotations. Of these, in-plane rotation may cause significant displacement of a mirror (e.g. at a portion of the mirror far away from the axis of rotation). Such rotation may result in contact between neighboring mirrors (or other structures), and may cause mirrors to stick to each other (e.g. stiction due to their small masses and large contact areas). Such contact may cause catastrophic failure of a MEMS device.

FIGS. 1A–B illustrate prior art one-dimensional high-fill ratio micromirror arrays 100 and 110 with mirrors labeled 102-A–F and 112-A–F, respectively. The mirrors 102-A–F of the one-dimensional micromirror array 100 shown in FIG. 1A are each supported from an edge with flexing support elements (e.g. support elements 101), and are designed to tip (i.e. rotation about an axis 105). The mirrors 102-A–F may also undesirably rotate in-plane (e.g. about one of the lower corners at the location of the support elements), as illustrated with mirror 102-D, even though the support structures (e.g. 101) are designed to suppress such rotation. As shown in FIG. 1A, mirror 102-D is displaced by an amount greater than the gap width between mirror 102-D and an adjacent mirror 102-E (e.g. at corner 108, due to the in-plane rotation), resulting in contact with the adjacent mirror 102-E. Such contact can cause damage to the mirrors and failure of the mirror array.

In the prior art micromirror array 110, shown in FIG. 1B, the mirrors 112-A–F of the one-dimensional micromirror array 110 are each supported from the center of the mirror by a flexing support structure (e.g. support structure 111, shown in phantom) beneath the mirror. The mirror array design allows the mirrors 112-A–F to piston (i.e. translation out of plane) and/or tip (i.e. rotate about axis 115) and/or tilt (e.g. rotate about axis 116, for mirror 112-A). The mirrors 112-A–F may also undesirably rotate (in-plane) about the mirror's center (at the location of the support structures), as illustrated with mirror 112-D, even though the support structure is designed to suppress such rotation. As shown in FIG. 1B, mirror 112-D is displaced by an amount greater than the gap width between mirror 112-D and the adjacent mirrors 112-C and 112-E (due to the in-plane rotation) resulting in contact with the adjacent mirrors 112-C and 112-E (e.g. at corners 117 and 118, respectively). As with micromirror array 100, such contact can cause damage to the mirrors and failure of the mirror array.

FIG. 2 illustrates a prior art two-dimensional high-fill ratio micromirror array 200, with mirrors labeled 202-A-1 ... 202-F-6. Each micromirror in the micromirror array 200 is supported from the center of the mirror by a support structure (e.g. support structure 205 for mirror 202-A-1), as similarly discussed above with reference to the mirrors shown in FIG. 1C. The mirror array design allows the mirrors 202-A-1 ... 202-F-6 to piston and/or tip and/or tilt about the support point. The mirrors 202-A-1 ... 202-F-6 may also undesirably rotate (in-plane) about the support point, as illustrated with mirror 202-C-5, even though the support structure is designed to suppress such rotation. As shown in FIG. 2, mirror 202-C-5 is displaced by an amount greater than the gap between the mirror 202-C-5 and adjacent mirrors 202-C-4, 202-B-5, 202-C-6, 202-D-5 (due to the in-plane rotation) resulting in contact with these adjacent mirrors 202-C-4, 202-B-5, 202-C-6, 202-D-5 (e.g. at points 206, 207, 208 and 209, respectively). As with micromirror arrays 100 and 110, such contact can cause damage to the mirrors and failure of the mirror array.

BRIEF SUMMARY OF THE INVENTION

The present invention provides Micro-Electro-Mechanical System (MEMS) micromirror designs for use in high-fill-factor arrays which provide (as compared to prior art designs) a reduced likelihood of contact with adjacent mirrors in an array, substantially improved tolerance to in-plane rotation, and increased resistance to external shock that may excite a rotational vibration mode of the micromirrors and lead to array damage and failure.

In one preferred embodiment, a dense micromirror array apparatus is provided comprising a plurality of micromirrors. An edge portion of one of the micromirrors is at least partially tapered from, for example, a point on the edge, which is closest to a rotation point of the micromirror, to an adjacent edge to achieve a desired in-plane rotation tolerance.

In another preferred embodiment, a micromirror is provided comprising at least one edge portion being at least partially tapered at a desired angle θ to allow in-plane rotation of the micromirror by at least an angle of θ. The angle θ is selected to provide a desired micromirror fill ratio while achieving a desired in-plane rotation tolerance.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments that are presently preferred. It should be understood, however, that the invention is not limited to the precise arrangements and instrumentalities shown.

In the drawings:

FIG. 2 illustrates a prior art two dimensional micromirror array;

DETAILED DESCRIPTION OF THE INVENTION

Figure 1:
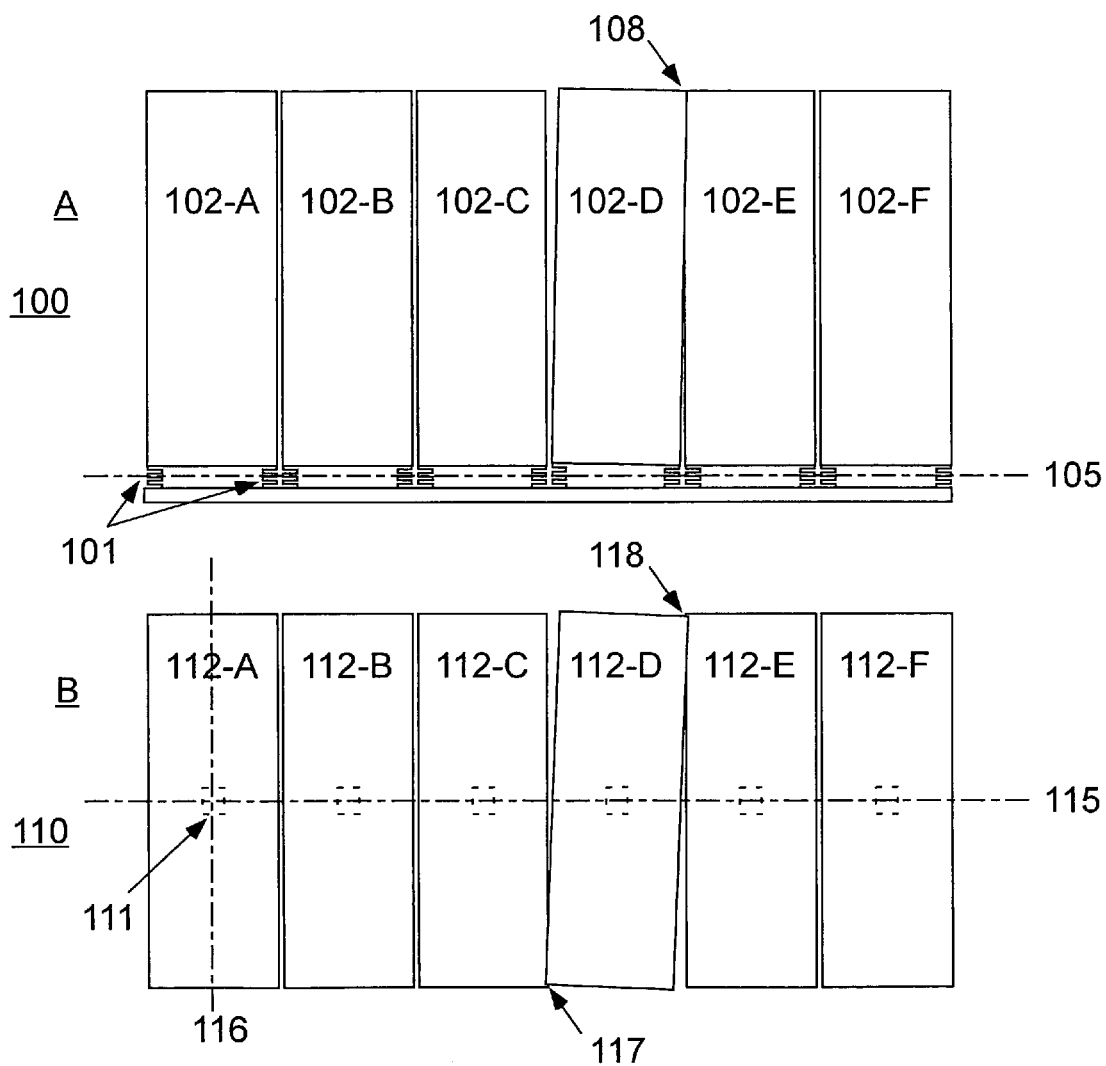
FIGS. 1 A–B illustrate prior art one dimensional micromirror arrays.
Figure 3:
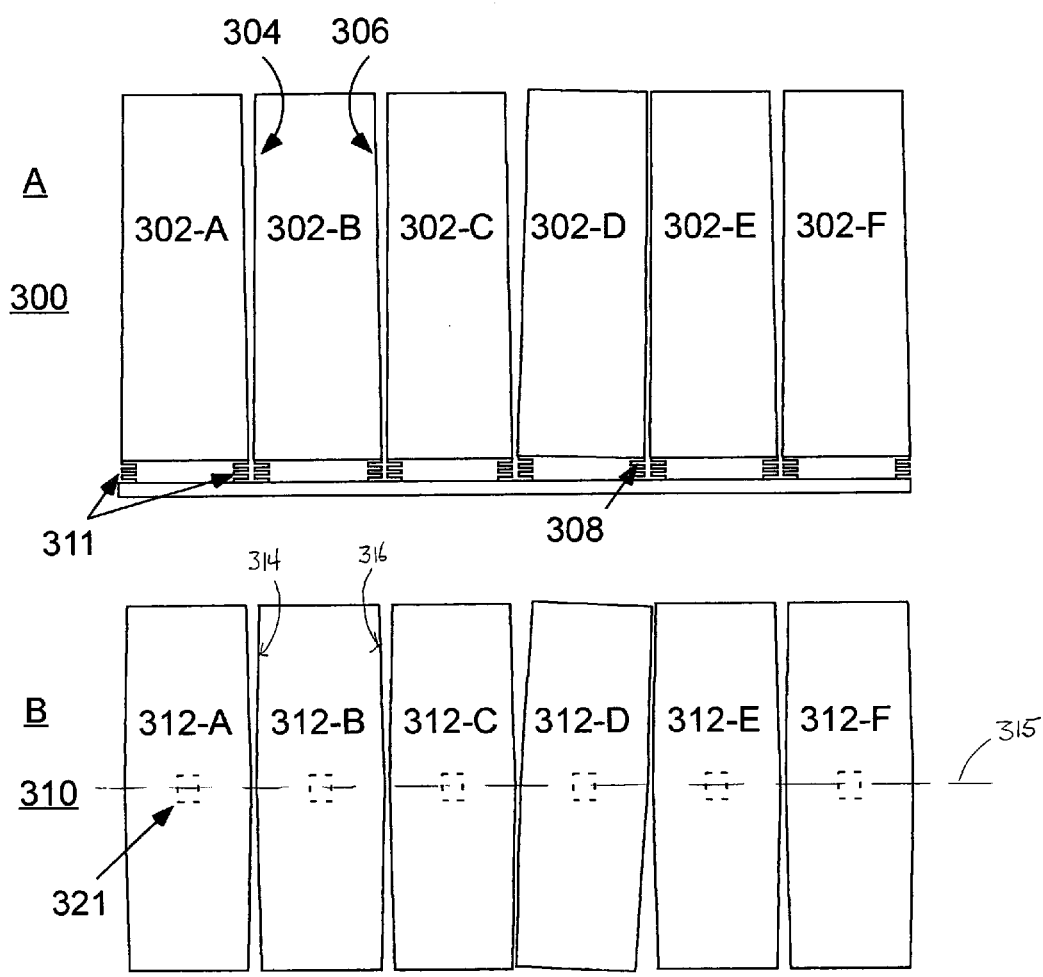
FIGS. 3 A–B illustrate one-dimensional micromirror arrays in accordance with embodiments of the present invention.

In one preferred embodiment of the invention shown in FIG. 3A, a one-dimensional dense micromirror array 300 is provided comprising a plurality of micromirrors 302-A–F. The mirrors 302-A–F are each supported from an edge with flexing support elements (e.g. support element 311 for mirror 302-A).

As can be understood from FIG. 3A, side edges of the mirrors 302-A–F (e.g. side edges 304 and 306 for mirror 302-B) are tapered. By tapering the edges, the mirrors 302-A–F may experience in-plane rotation (e.g. mirror 302-D is rotated about a lower corner 308) without coming into contact with an adjacent mirror in the micromirror array 310.

It can be understood by those skilled in the art that, for each of the embodiments discussed herein, the amount or angle of the taper of the mirror edges (and the width of the intermirror gap) will determine the amount of in-plane rotation that can occur without contact between adjacent mirrors (i.e. the in-plane rotation tolerance). Additionally, those skilled in the will appreciate that the edges of the mirrors (or portions thereof) may be tapered along the full length of an edge or be partially tapered while still providing improved in-plane rotation tolerance. Further, the tapered edge portion(s) may include straight segments, curved segments, or the like to form the tapered edge portion(s).

In another preferred embodiment of the invention shown in FIG. 3B, a one-dimensional dense micromirror array 310 is provided comprising a plurality of micromirrors 312-A–F. The mirrors 312-A–F are each supported from beneath the mirror at a support point by a flexing support structure (e.g. support structure 321 for mirror 312-A, shown in phantom). The mirror array design allows the mirrors 312-A–F to piston and/or tip and/or tilt about the support point.

As can be understood from FIG. 3B, the side edges of the mirrors 312-A–F (e.g. side edges 314 and 316 for mirror 312-B) are tapered from a rotation axis 315 toward an adjacent edge. By tapering the edges, the mirrors 312-A–F may experience in-plane rotation without contact with adjacent mirrors. For example, mirror 312-D is rotated (in-plane) about the support point without contact with adjacent mirrors 312-C, 312-E in the micromirror array 300.

It will be appreciated by those skilled in the art that aspects of the present invention may be applied to two-dimensional mirror arrays, and/or to mirrors having various geometric shapes (e.g. shapes such as squares, triangles, rectangles, diamonds, hexagons, etc. . . . or other shapes that provide high-fill ratios).

Figure 4:
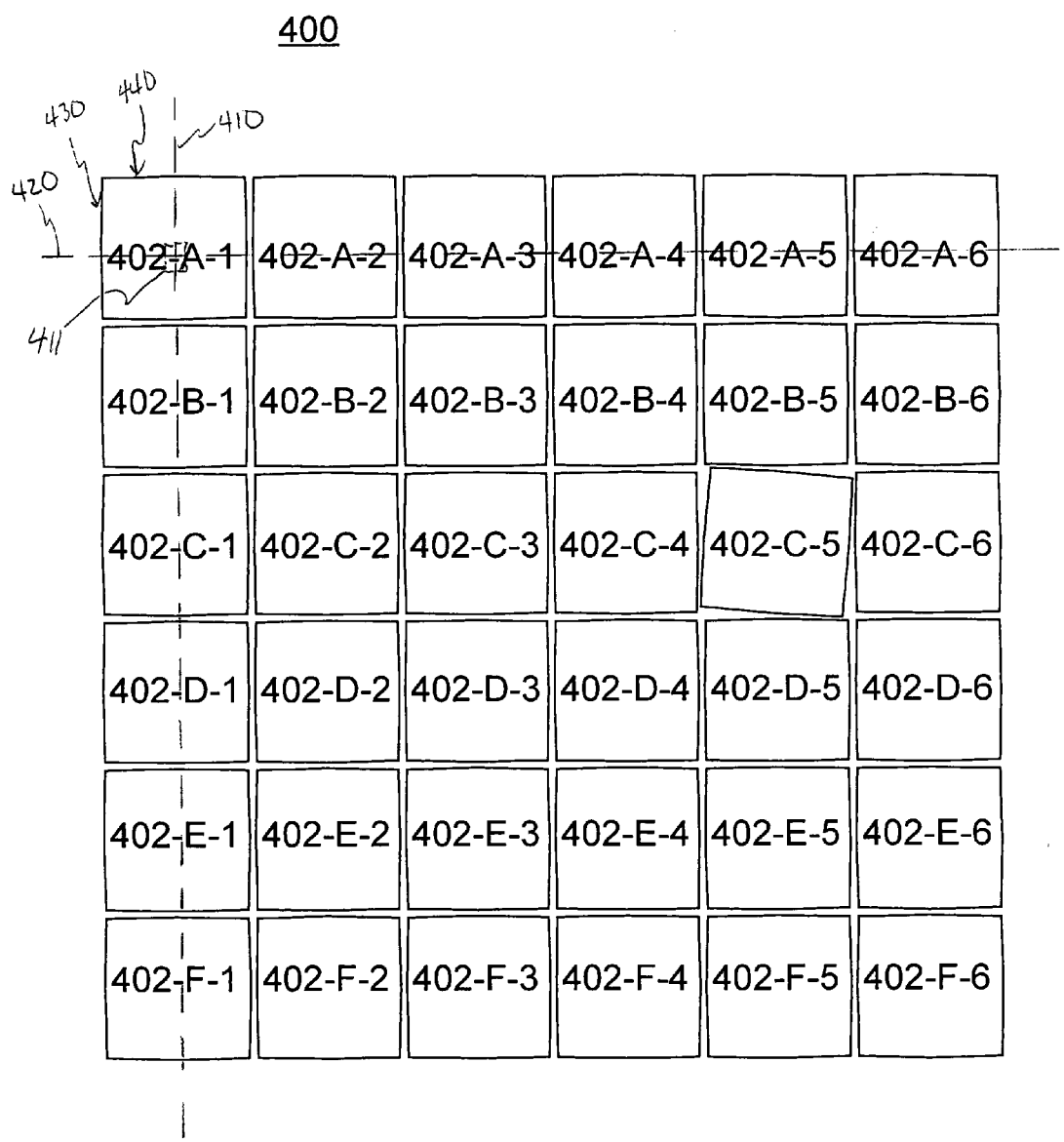
FIG. 4 illustrates a two dimensional micromirror array in accordance with an embodiment of present invention.

FIG. 4 illustrates one example of a two-dimensional high-fill-ratio micromirror array 400 in accordance with the present invention. The mirrors 402-A-1 . . . 402-F-6 are each supported from beneath the mirror at a support point by a flexing support structure (e.g. support structure 411, for mirror 402-A-1, shown in phantom). The mirror array design allows the mirrors 402-A-1 . . . 402-F-6 to piston and/or tip and/or tilt about the support point, as similarly discussed with reference to mirrors 312-A–F of FIG. 3B. One or more edge portion(s) (e.g. edge portions 430, 440 of mirror 402-A-1) of the mirrors 402-A-1 . . . 402-F-6 are preferably tapered from an axis of rotation (e.g. axis 410 and/or axis 420 for mirror 402-A-1) toward an adjacent edge. By tapering the edge portion(s), the mirrors 402-A-1 . . . 402-F-6 may experience in-plane rotation without contact with adjacent mirrors. For example, mirror 402-C-5 is rotated (in-plane about its support point) without contact with adjacent mirrors 402-B-5, 402-C-6, 402-D-5, and 402-C-4 in the micromirror array 400.

As discussed above, it is understood that the amount or angle of the taper of the mirror edges (and the width of the intermirror gap) will determine the amount of in-plane rotation that can occur without contact between adjacent mirrors (or other structures). Additionally, those skilled in the will appreciate that the edges of the mirrors (or portions thereof) may be tapered along the full length of an edge, or be partially tapered while still providing improved in-plane rotation tolerance. Further, it is understood that it is not necessary that each edge of each mirror 402-A-1 . . . 402-F-6 be tapered to improve the in-plane rotation tolerance of one or more mirrors of a mirror array in accordance with the invention. Further, the tapered edge portion(s) may include straight segments, curved segments, or the like to form the tapered edge portion(s).

Figure 5A:
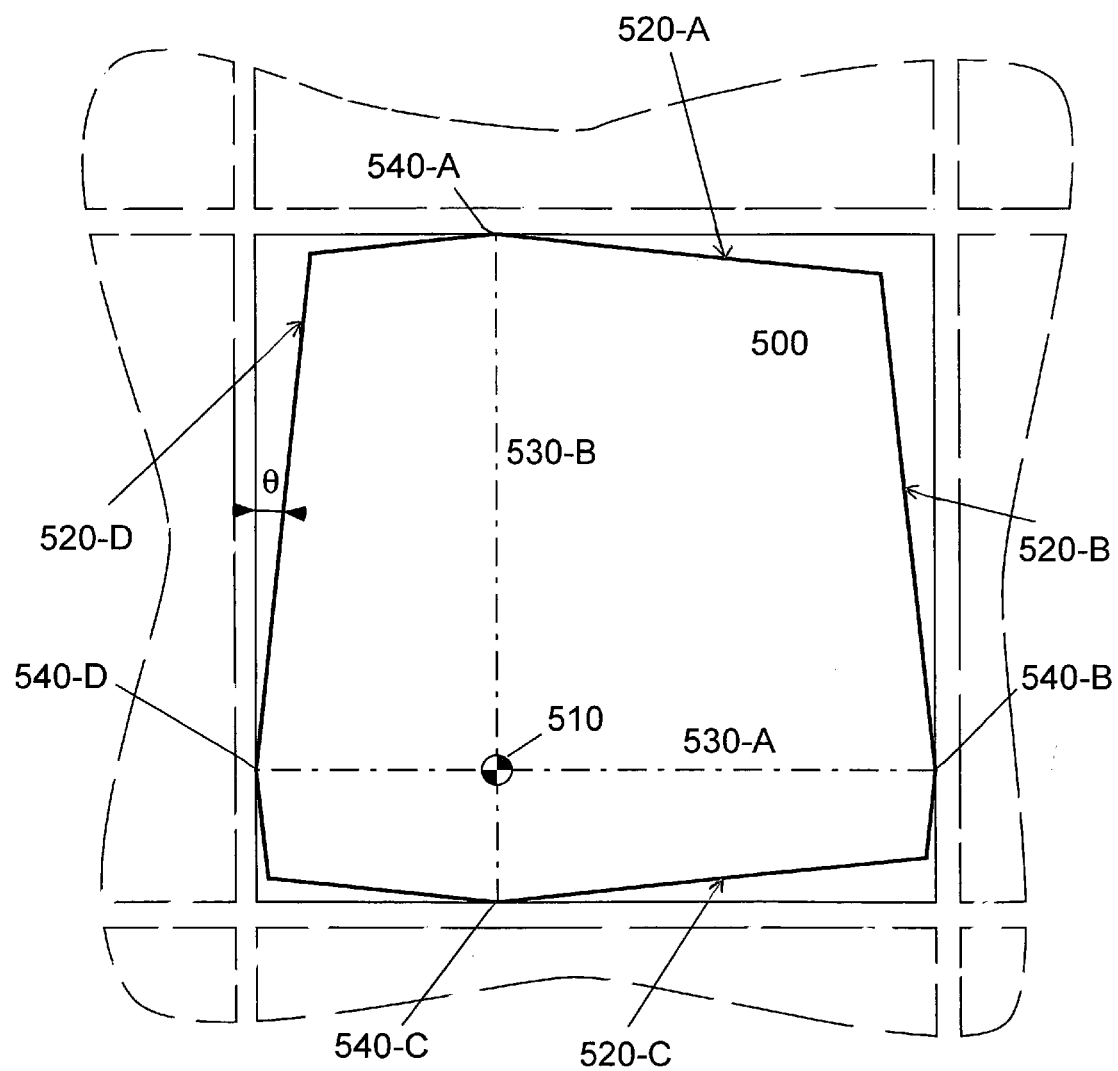
FIG. 5A illustrates a micromirror in accordance with an embodiment present invention.
Figure 5B:
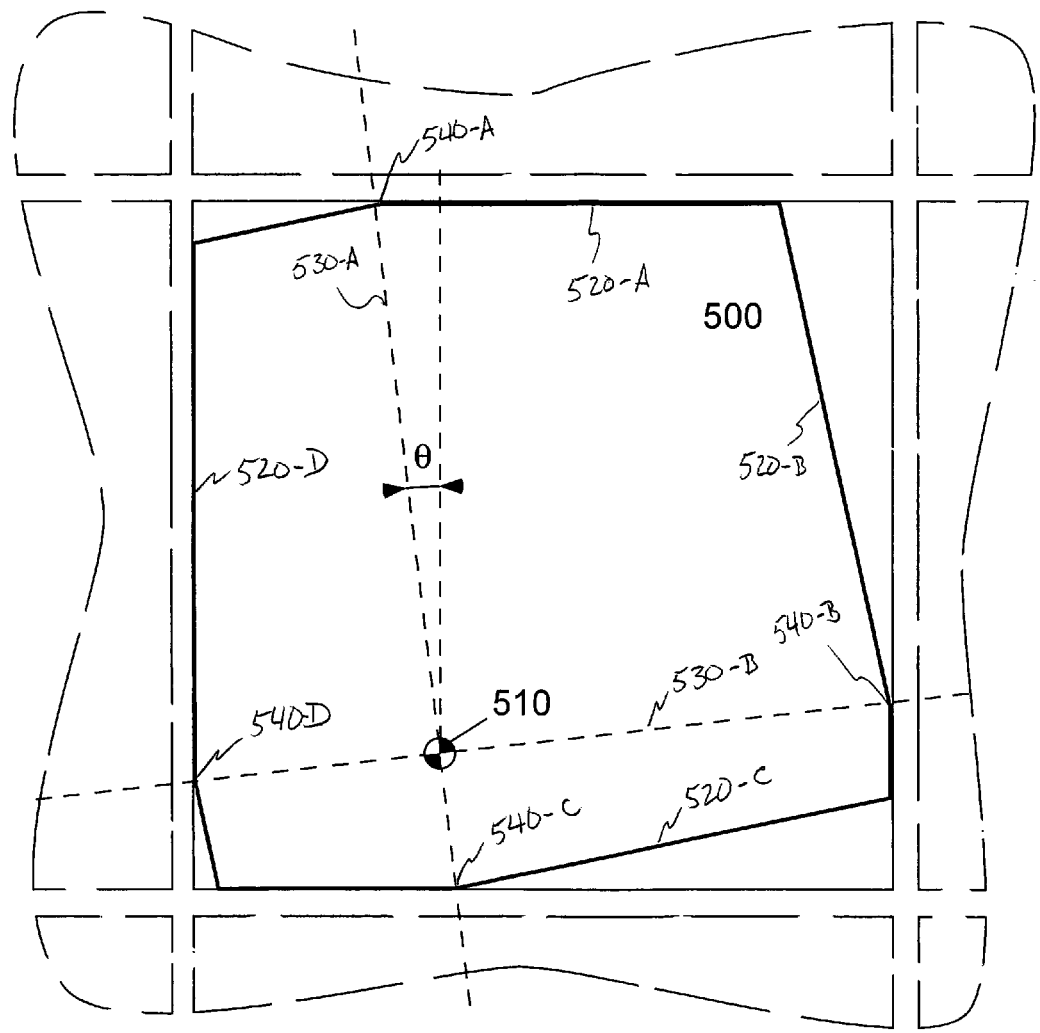
FIG. 5B illustrates the micromirror of FIG. 5A after in-plane rotation.

FIG. 5A illustrates another embodiment of the invention wherein a mirror 500 is supported from below at a rotation point 510 and can piston and/or tip (e.g. rotate about axis 530-A) and/or tilt (e.g. rotate about axis 530-B). One or more edge portion(s) (e.g. edge portions 520-A, 520-B, 520-C, 520-D) of the mirror 500 is tapered from a point on an edge, which is closest to the rotation point 510 (e.g. at points 540-A, 540-B, 540-C, 540-D), to an adjacent edge. As shown in FIG. 5B, the mirror 500, when placed within a high-fill-ratio micromirror array (shown in phantom), may (undesirably) rotate in-plane about the rotation point 510 by at least an angle θ without contact with adjacent mirrors in the micromirror array.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A dense micromirror array apparatus comprising:
   a plurality of micromirrors, wherein at least one edge portion of at least one of the plurality of micromirrors is at least partially tapered to allow in-plane rotation of the at least one micromirror without contact with an adjacent micromirror.

2. The apparatus according to claim 1, wherein the at least one edge portion is tapered from a point closest to a center of rotation on the at least one edge of the at least one micromirror, to an adjacent edge.

3. The apparatus according to claim 1, wherein the micromirror array is a one-dimensional array.

4. The apparatus according to claim 1, wherein the micromirror array is a two-dimensional array.

5. The apparatus according to claim 1, wherein the at least one edge portion is tapered at an angle θ.

6. The apparatus according to claim 5, wherein the taper angle θ is selected to provide a desired in-plane rotation tolerance and a desired mirror fill ratio.

7. A micromirror comprising:
   at least one edge portion being at least partially tapered so as to provide a desired micromirror fill ratio and a desired in-plane rotation tolerance.

8. The micromirror according to claim 7, wherein the at least one edge portion is tapered at an angle θ to allow in-plane rotation of the micromirror by at least an angle of θ.

9. The micromirror according to claim 8, wherein the taper angle θ is selected to provide the desired in-plane rotation tolerance and the desired mirror fill ratio.

10. The micromirror according to claim 7, wherein the edge portion is tapered using one or more curved segments.

11. A micromirror array comprising:

a plurality of micromirrors, wherein at least one micromirror has at least one tapered edge portion to provide a desired in-plane rotation tolerance and a desired mirror fill ratio.

* * * * *